(12) United States Patent
Nowsch

(10) Patent No.: US 7,885,491 B2
(45) Date of Patent: Feb. 8, 2011

(54) METHOD FOR PRODUCING A BENDING SENSOR

(75) Inventor: Helmut Nowsch, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 229 days.

(21) Appl. No.: 12/308,324

(22) PCT Filed: May 31, 2007

(86) PCT No.: PCT/EP2007/055288

§ 371 (c)(1),
(2), (4) Date: Dec. 12, 2008

(87) PCT Pub. No.: WO2007/144269

PCT Pub. Date: Dec. 21, 2007

(65) Prior Publication Data
US 2010/0232739 A1    Sep. 16, 2010

(30) Foreign Application Priority Data
Jun. 13, 2006   (DE) .................. 10 2006 027 421

(51) Int. Cl.
*G02B 6/00* (2006.01)
(52) U.S. Cl. .............. 385/13; 385/12; 385/129
(58) Field of Classification Search ............ 385/12, 385/13, 129
See application file for complete search history.

(56) References Cited

U.S. PATENT DOCUMENTS

| | | | |
|---|---|---|---|
| 4,654,520 A | 3/1987 | Griffiths | |
| 5,084,615 A | 1/1992 | Tracey | |
| 5,168,156 A * | 12/1992 | Fischer et al. .......... | 250/227.21 |
| 6,696,974 B1 * | 2/2004 | Mathis ..................... | 340/854.7 |
| 2003/0154802 A1 * | 8/2003 | Culshaw et al. .............. | 73/800 |
| 2004/0083808 A1 | 5/2004 | Dria et al. | |
| 2006/0017295 A1 | 1/2006 | Danisch | |
| 2007/0198155 A1 | 8/2007 | Danisch | |

FOREIGN PATENT DOCUMENTS

| | | |
|---|---|---|
| CA | 2424708 A1 | 10/2004 |
| DE | 4433738 A1 | 3/1996 |
| DE | 102005011389 A1 | 12/2005 |
| EP | 0393956 A2 | 10/1990 |
| WO | WO 2004089699 A1 | 10/2004 |

OTHER PUBLICATIONS

The socially responsible car; Fachzeitschrift "Automotive Engineering", Apr. 2004, S. 48 ff; Magazine; 2004; DE.

* cited by examiner

*Primary Examiner*—Jennifer Doan
(74) *Attorney, Agent, or Firm*—Cohen Pontani Liberman & Pavane LLP

(57) ABSTRACT

At least one sensing region is formed on the bending sensor by providing a flexurally elastic base cover which is interrupted in at least one partial region of the sensing region or is structured using elevations and/or depressions. At least one planar optical fiber core is generated on the base cover. The optical fiber core has a greater index of refraction than the base cover. The optical fiber core is covered by a shroud. The optical fiber core has a greater index of refraction than the shroud.

23 Claims, 5 Drawing Sheets

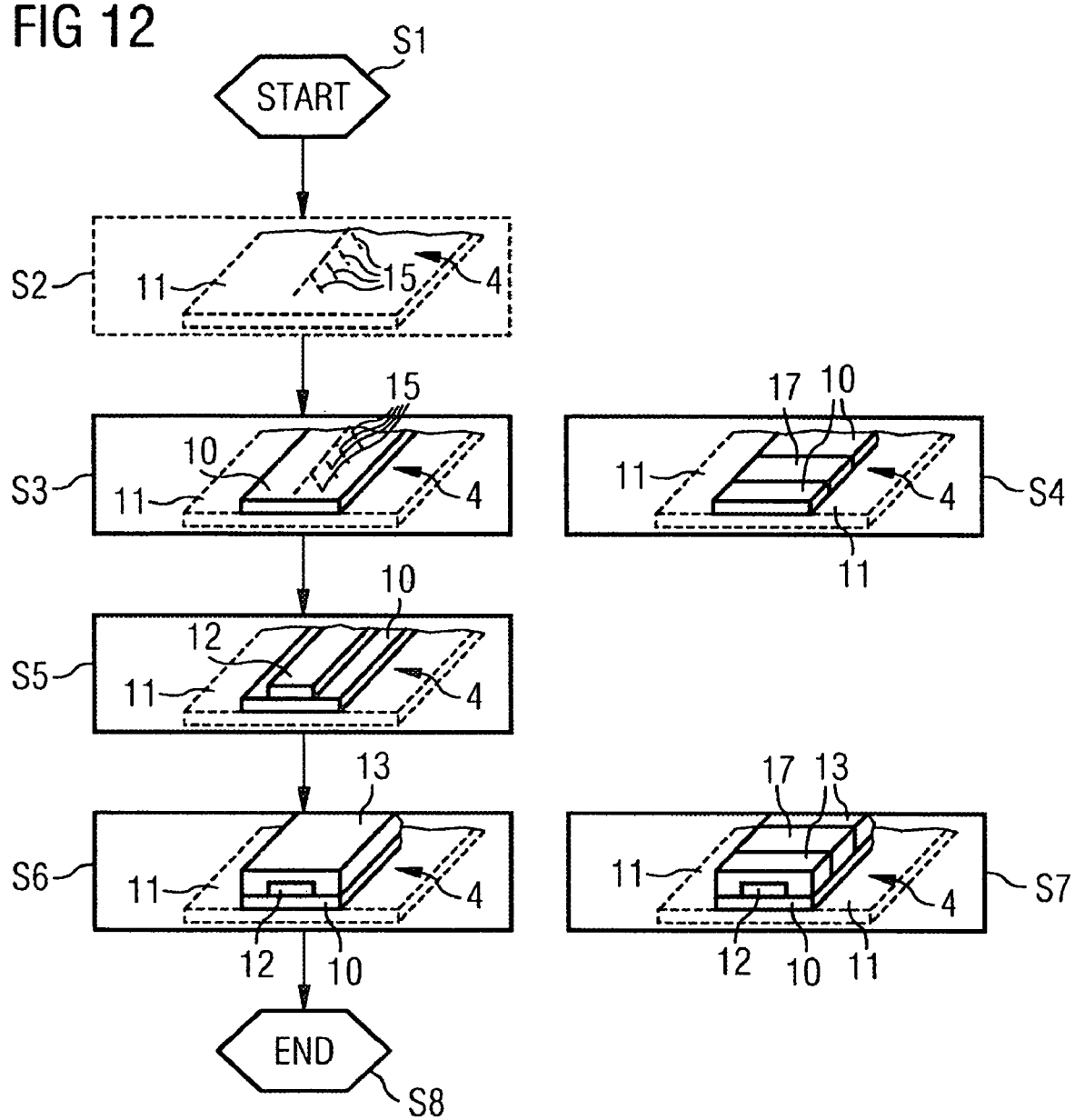

METHOD FOR PRODUCING A BENDING SENSOR

PRIORITY CLAIM

This is a U.S. national stage of application No. PCT/EP2007/055288, filed on 31 May 2007. Priority is claimed on the following application: Country: Germany, Application No.: 10 2006 027 421.0, Filed: 13 Jun. 2006, the content of both of which are incorporated here by reference.

BACKGROUND OF THE INVENTION

1. Field of the Invention

The invention relates to a method for manufacturing a bending sensor, in particular a strip-shaped bending sensor for an impact sensor device of a pedestrian protection system of a vehicle.

2. Description of the Related Art

Studies have shown that a high proportion of fatal accidents in road traffic involve pedestrians. For this reason, legislation initiatives are under way aimed at making the provision of devices for protecting pedestrians in the case of a collision with a vehicle compulsory in modern motor vehicles.

There is a particularly high risk of injury for a pedestrian when there is a collision between a vehicle and the distance between a typically easily deformable engine hood and a rigid engine block is very small. The arrangement of increasingly large numbers of electronic components in the region of the engine compartment and the fact that vehicles are of very compact design results in the engine compartment being tightly packed with very rigid elements. If a collision occurs with a pedestrian, there is therefore a high risk of severe head injuries if the pedestrian's head impacts against the engine hood and therefore comes into contact with the components located underneath the engine hood.

On the other hand, the risk of injury can be reduced greatly given a sufficiently large distance of, for example, over 10 cm between the engine hood and the engine components arranged underneath it, since the engine hood can absorb a sufficiently large amount of energy as a result of the deformation and can therefore brake the pedestrian's movement comparatively gently.

In order to increase safety of pedestrians in road traffic, the European Automobile Manufacturers' Association (ACEA), for example, has given a commitment to the authorities of the European Union to halve the number of traffic deaths involving pedestrians by the year 2010 by means of measures in vehicles. One measure for this purpose is to construct vehicles with correspondingly spaced engine hoods. However, this is frequently impossible due to the required compactness of vehicles.

In order to ensure sufficient attenuation in the event of a collision with a pedestrian, it has been proposed, if an impact of a person against the vehicle is detected, to raise the engine hood by more than 10 cm from its closed position in order to provide a sufficient area for deformation. The need for such safety systems to be not only reliable but also very cost-effective presents an enormous challenge for these systems.

For example, an article in the specialist journal "Automotive Engineer", April 2004, page 48 ff., discloses, as an actuator for raising the engine hood, a spring-based actuator whose spring is prestressed and in the event of a detected collision is released, with the result that the engine hood is correspondingly raised. However, pyrotechnic actuators are also known from the abovementioned article.

CA 2 424 708 A1 discloses a method and a device for detecting a collision between a vehicle and an object. Lightguide fibers are arranged along a front bumper of the vehicle. The lightguide fibers comprise, in their fiber jacket, light exiting regions which are arranged along the lightguide fibers. A collision causes the lightguide fibers to bend. The attenuation of the light which is transmitted in the lightguide fibers changes as a result of the bending of the lightguide fiber if the lightguide fiber is bent in the light exiting region. A signal is acquired from the light which is modulated in this way and said signal is processed in a signal processor. A safety device, for example for raising an engine hood, can be activated in this way.

SUMMARY OF THE INVENTION

An object of the invention is to provide a method for manufacturing a bending sensor which is simple and cost-effective.

The object is achieved by means of the features of the independent patent claims. Advantageous developments of the invention are characterized in the subclaims.

According to a first aspect, the invention is characterized by a method for manufacturing a bending sensor. At least one sensing region is formed on the bending sensor by providing a flexurally elastic base jacket which is interrupted in at least one partial region of the sensing region or is patterned by means of elevations and/or depressions. At least one planar lightguide core is produced on the base jacket. The lightguide core has a higher refractive index than the base jacket. The lightguide core is covered by a covering jacket. The lightguide core has a higher refractive index than the covering jacket.

The advantage is that, in the at least one partial region, total reflection at a boundary between the lightguide core and the base jacket is eliminated for some of the light which can be guided in the lightguide core. As a result, a light exiting region is formed in the at least one partial region. Depending on the bending of the bending sensor, the degree of exiting of the light and therefore attenuation of the light in the respective lightguide core is variable. A further advantage is that the base jacket and/or the covering jacket do not have to be removed, and the at least one light guide core does not have to be post-processed in order to provide the light exiting region. The at least one planar lightguide core is easy and cost-effective to manufacture in different shapes, with the result that the bending sensor can be manufactured very easily in a way which is suitable for a desired application, for example as a sensor strip for an impact sensor device of a pedestrian protection system of a vehicle. In this context, the bending sensor can, in particular, be formed so as to correspond to the respective shape of a bumper.

In one advantageous refinement, a flexurally elastic carrier is provided which is patterned in the at least one partial region of the sensing region of the bending sensor by means of elevations and/or depressions. The base jacket is formed on the carrier. The elevations and/or depressions in the base jacket or the interruption in the base jacket are formed by means of the elevations and/or depressions in the carrier. This has the advantage that the base jacket can be applied continuously to the carrier in a very easy and cost-effective way. The patterning or the interruptions in the base jacket result automatically at the locations predefined by the patterning of the carrier. The patterning or the interruptions in the base jacket can thus be manufactured very easily.

In a further advantageous refinement, the base jacket and/or the covering jacket are replaced in the at least one partial region by a jacket replacement whose refractive index differs from the refractive index of the base jacket or which absorbs incident light. In particular, the refractive index of the jacket replacement is higher than the refractive index of the base jacket. This has the advantage that the loss of light in the at least one partial region is dependent on the refractive index of the jacket replacement, and that the loss of light can be predefined very easily by suitably selecting the refractive index of the jacket replacement.

According to a second aspect, the invention is characterized by a method for manufacturing a bending sensor. At least one planar lightguide core is produced on a flexurally elastic base jacket. The lightguide core has a higher refractive index than the base jacket. At least one sensing region is formed on the bending sensor, in a light path between a light injection region and a light extraction region of the lightguide core by producing a covering jacket which covers the at least one lightguide core and which is interrupted in at least one partial region of the sensing region. The covering jacket is replaced in the at least one partial region by a jacket replacement whose refractive index differs from the refractive index of the base jacket or which absorbs incident light.

An advantage is that, in the at least one partial region, a total reflection at a boundary between the lightguide core and the covering jacket is eliminated for some of the light which can be guided in the lightguide core. As a result, a light exiting region is formed in the at least one partial region. Depending on the bending of the bending sensor, a degree of exiting of the light and therefore attenuation of the light in the respective lightguide core is variable. A further advantage is that the base jacket and/or the covering jacket do not have to be removed, and the at least one lightguide core does not have to be post-processed in order to provide the light exiting region. The at least one planar lightguide core is simple and cost-effective to manufacture in different shapes, with the result that the bending sensor can be manufactured very easily in a way which is suitable for a desired application, for example as a sensor strip for an impact sensor device of a pedestrian protection system of a vehicle. In this context, the bending sensor can, in particular, be formed so as to correspond to the respective shape of a bumper. In addition, the loss of light in the at least one partial region is dependent on the refractive index of the jacket replacement. The loss of light can therefore be predefined very easily by suitably selecting the refractive index of the jacket replacement. In particular, the refractive index of the jacket replacement is higher than the refractive index of the base jacket.

In a further advantageous refinement, at least one groove, in which in each case a light guide core is produced, is formed in the base jacket. The advantage is that as a result the lightguide core can be manufactured particularly easily and precisely.

In a further advantageous refinement, at least one mirror is arranged on the lightguide core for deflecting the light which can be guided in the lightguide core parallel to a plane of the base jacket in the lightguide core. As a result, the light which can be guided in the lightguide core can be deflected to a greater degree in the lightguide core than would be possible as a result of a minimum permissible radius of curvature of the lightguide core without loss of the total reflection at a boundary between the lightguide core and the base jacket or the covering jacket. The light can therefore be guided very tightly and with little space requirement for the profile of the at least one lightguide core, and very easily parallel to the plane of the base jacket compared to an unbent state of the bending sensor. The bending sensor can, as a result, be made very compact and economical in terms of space. In particular, a reversing region for possibly necessary routing back of the lightguide core can be made particularly compact.

In this context it is advantageous if in each case a prism whose end faces are mirrored is arranged at one end of the at least one lightguide core. This has the advantage that the light can be reflected back into the lightguide core. As a result, the light can be guided in opposite directions through the lightguide core. The lightguide core therefore does not have to be routed back, and a particularly compact design of the bending sensor is therefore possible.

In this context it is also advantageous if a semi-transparent mirror is located in the at least one lightguide core, separating the forward travelling light and the returning light in the respective lightguide core. This has the advantage that the forward travelling light and the returning light can be separated easily and reliably. The semi-transparent mirror can also be integrated very easily into the lightguide core. As a result, the bending sensor can be made particularly compact.

Alternatively, the light injection region and the light extraction region of the respective lightguide core are embodied as a common light injection region and light extraction region of the respective lightguide core, that is to say the light injection region and the light extraction region of the respective lightguide core are arranged at a common end of the lightguide core. This has the advantage that the forward travelling light and the returning light do not have to be separated and the bending sensor can be made particularly compact. The light source which is assigned to the respective lightguide core, and the light sensor which is assigned to the respective lightguide core, can therefore be made particularly compact and arranged closely one next to the other at the common light injection region and light extraction region. In particular, the light source and the light sensor of the respective lightguide core can also be embodied as a common component and arranged at the common light injection region and light extraction region. The bending sensor can therefore be made particularly simple and compact.

In a further advantageous refinement, at least two lightguide cores are formed on the base jacket. An optical coupler, which divides the light which can be injected at the light injection region between the at least two lightguide cores, is formed at the light injection region of the bending sensor on the base jacket. The advantage is that the optical coupler can be integrated easily and cost-effectively with the at least two lightguide cores and therefore no additional components are necessary for the optical coupler. In addition, only one light source for feeding the at least two lightguide cores is therefore necessary.

In a further advantageous refinement, at least one light source is embedded at the light injection region of the at least one lightguide core, and/or a light sensor is embedded at the light extraction region of the at least one lightguide core into the base jacket and/or into the lightguide core and/or into the covering jacket. The advantage is that as a result particularly reliable injection of the light into the respective lightguide core or particularly reliable sensing of the light in the respective lightguide core is possible. In addition, the embedding of the at least one light source and/or of the at least one light sensor is easy and cost-effective. A further advantage is that there is no need for complex and expensive processing of the at least one lightguide core at the light injection region and/or the light extraction region for the injection or extraction of the light. In addition, no additional components are necessary for the injection or extraction of the light.

In a further advantageous refinement, the at least one lightguide core is applied to the base jacket as liquid polymer metered by a dispenser in accordance with a desired profile of the lightguide core, and is subsequently cured. The application of the polymer is carried out, for example, by a fine hollow needle of the dispenser. As a result, precise metering and precise embodiment of the profile of the lightguide core are possible. In addition, the application of the polymer is therefore easy, quick and cost-effective.

In an alternative refinement, the at least one lightguide core is applied to the base jacket as liquid polymer by means of a jet printing method in accordance with a desired profile of the lightguide core, and is subsequently cured. This has the advantage that precise metering and precise refinement of the profile of the lightguide core are possible. In addition, the application of the polymer is therefore easy, cost-effective and particularly quick.

In a further alternative refinement, the at least one lightguide core is applied to the base jacket as liquid polymer and is cured by means of a direct writing method in accordance with a desired profile of the lightguide core.

This has the advantage that precise formation of the lightguide core is possible, and that the lightguide core is therefore produced easily, quickly and cost-effectively.

BRIEF DESCRIPTION OF THE DRAWINGS

Exemplary embodiments of the invention are explained below with reference to the schematic drawings, in which:

FIG. 12 shows a flowchart of a method for manufacturing the bending sensor.

Elements with the same design or function are provided with the same reference symbols in all the figures.

DETAILED DESCRIPTION OF THE PRESENTLY PREFERRED EMBODIMENTS

Figure 1:
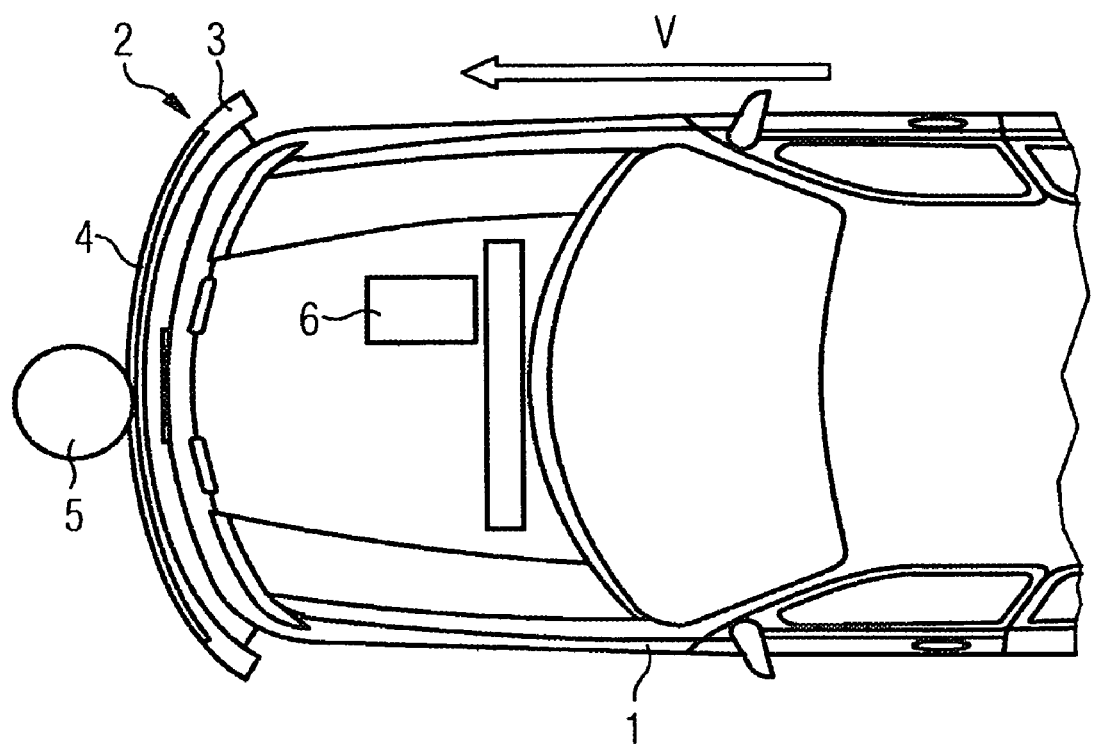
FIG. 1 shows a vehicle and an impact object.

A vehicle 1 has an impact sensor device 2 (FIG. 1). The impact sensor device 2 has a sensing region 4 which is arranged along a bumper 3 of the vehicle 1. By means of the sensing region 4, the impact sensor device 2 can detect an impact of an impact object 5. The impact object 5 may be, for example, a pedestrian. In addition, the vehicle 1 has an evaluation unit 6 in which measurement signals which are supplied by the impact sensor device 2 are evaluated, and depending on the profile of the respective measurement signal an impact of the impact object 5 is detected and, if appropriate, measures for protecting the impact object 5 or the vehicle occupants are initiated. The measures can be, for example, slight raising of an engine hood of the vehicle or else firing of one or more airbags.

Figure 2:
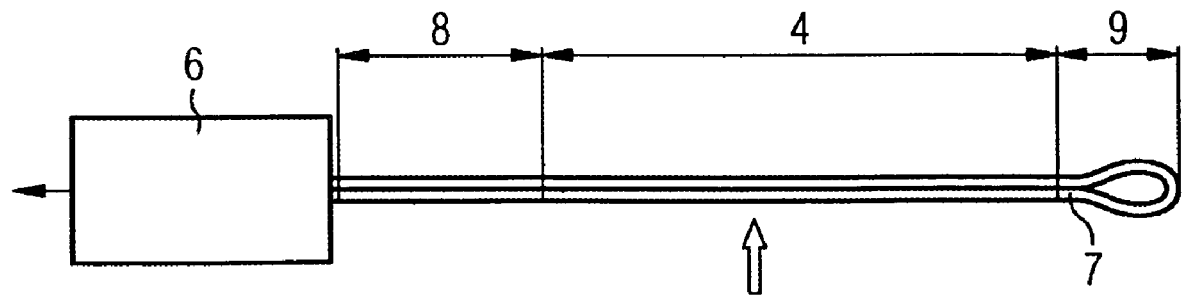
FIG. 2 shows an impact sensor device.

The impact sensor device 2 comprises the evaluation unit 6 and a sensor strip 7 which comprises a bending sensor or which forms the bending sensor (FIG. 2). The sensor strip 7 has an inlet region 8, a deflection region 9 and the sensing region 4. The evaluation unit 6 comprises light sources 33 and light sensors 34 which are coupled to the sensor strip 7. Alternatively, the light sources 33 and/or the light sensors 34 can also be arranged in the bending sensor. As a result of bending of the sensor strip 7 in the sensing region 4, the attenuation of the light in the sensor strip 7 changes. The evaluation unit 6 is designed to sense this change in the attenuation.

Figure 3A:
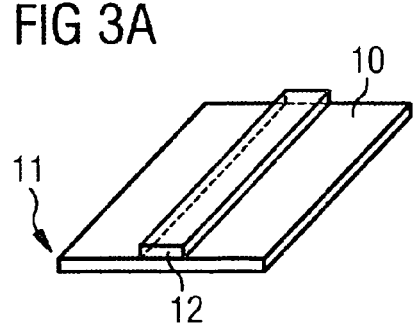
FIGS. 3A, B show a first embodiment of a planar lightguide structure.
Figure 3B:
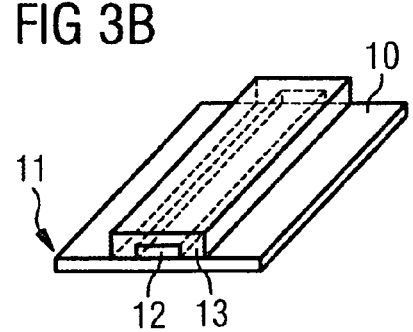

FIGS. 3A and 3B present a first embodiment of a planar lightguide structure of the sensor strip 7. The sensor strip 7, which forms the bending sensor, comprises a flexurally elastic base jacket 10 which forms a carrier 11. A planar lightguide core 12 is formed as a layered optical waveguide on the base jacket 10. The lightguide core 12 is covered by a covering jacket 13. The sensor strip 7 is, for example, approximately 1.5 to 2.5 meters long and is preferably only a few millimeters wide, for example approximately 6 millimeters. The sensor strip 7 or the bending sensor can, however, also be made shorter or longer or narrower or wider. The lightguide core 12 preferably has a width of less than 500 micrometers. A width of 100 micrometers or less is particularly advantageous. However, the lightguide core 12 can also be made wider.

A refractive index of the base jacket 10 and of the covering jacket 13 is preferably selected in such a way that the light which can be guided in the lightguide core 12 experiences total reflection at a boundary between the lightguide 12 and the base jacket 10 or the covering jacket 13. For this purpose, the base jacket 10 and the covering jacket 13 are embodied in such a way that a refractive index of the lightguide core 12 is in each case larger than the refractive index of the base jacket 10 and of the covering jacket 13. The refractive index of the covering jacket 13 is preferably the same as the refractive index of the base jacket 10.

In addition, the base jacket 10 and the covering jacket 13 are preferably manufactured from the same material. For example, the lightguide core 12, the base jacket 10 and the covering jacket 13 are manufactured from the same material, for example from a polyimide, an epoxy resin or polymethylmethacrylate, abbreviated as PMMA. However, the lightguide core 12 on the one hand and the base jacket 10 and the covering jacket 13 on the other are doped differently, for example with fluorine, so that they have a different refractive index.

The lightguide core 12 is preferably a polymer lightguide core which is produced by applying the polymer in liquid form to the base jacket 10 and by subsequent curing of the polymer in a desired profile and in a desired shape. For this purpose, the liquid polymer is preferably made light sensitive, with the result that the liquid polymer can be cured by exposure to light, for example by exposure to ultraviolet light.

Figure 4A:
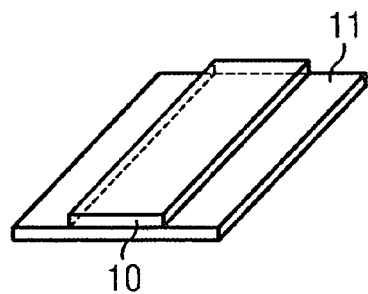
FIGS. 4A, B, C show a second embodiment of the planar lightguide structure.
Figure 4B:
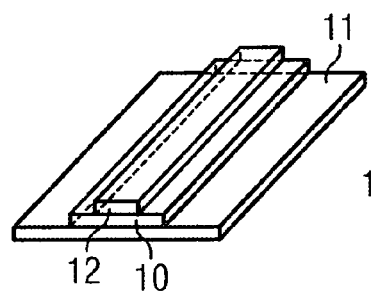
Figure 4C:
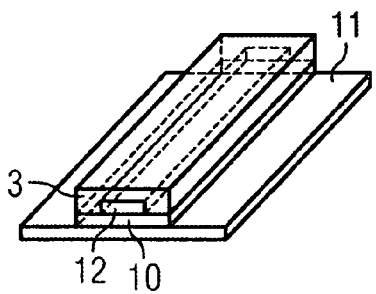

FIGS. 4A, 4B and 4C show a second embodiment of the planar lightguide structure of the sensor strip 7. The carrier 11 is embodied as a separately prefabricated flexurally elastic component. The carrier 11 is manufactured, for example, from polyethylene, but can also be manufactured from another material. The carrier 11 does not have to have any particular optical properties. However, the carrier 11 is, depending on the configuration of the bending sensor, preferably manufactured from a light-absorbing material. The base jacket is formed on the carrier 11. The lightguide core 12 is formed on the base jacket 10. The lightguide core 12 is covered by the covering jacket 13.

Figure 5A:
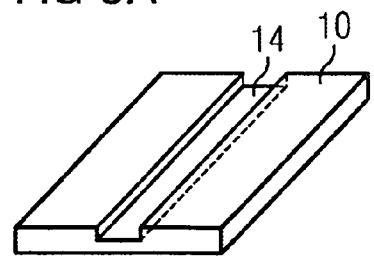
FIGS. 5A, B, C show a third embodiment of the planar lightguide structure.
Figure 5B:
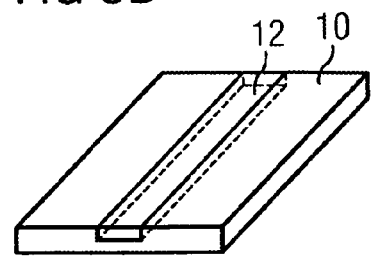
Figure 5C:
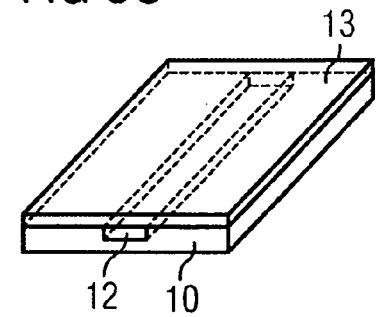

FIGS. 5A, 5B and 5C show a third embodiment of the planar lightguide structure of the sensor strip 7. A groove 14, in which the lightguide core 12 is formed, is formed in the base jacket 10. The lightguide core 12 is covered by the covering jacket 13.

Basically the same conditions which have already been explained above apply to the optical properties for all embodiments, in particular the refractive indices, the lightguide core 12, the base jacket 10, the covering jacket 13 and the carrier 11. Two or more than two lightguide cores 12 can also be formed on the base jacket 10, and said lightguide cores 12 preferably extend parallel to one another in the longitudinal direction of the sensor strip 7.

For the functions of a bending sensor, the sensor strip 7 comprises at least one light exiting region 16 in the sensing region 4. The at least one light exiting region 16 is embodied in such a way that, depending on the bending of the bending sensor in the light exiting region 16, a different proportion of the light guided in the lightguide core 12 can exit from the lightguide core 12. As a result, the light which is injected into the lightguide core 12 experiences a different degree of attenuation depending on the bending of the bending sensor in the light exiting region 16. The current degree of bending of the bending sensor can therefore be inferred from the attenuation of the light. If more than one lightguard core 12 is provided, each lightguide core 12 preferably has the at least one light exiting region 16 at a different position within the sensing region 4. As a result, the position of the bending of the bending sensor can be determined as a function of the attenuation of the light in the respective lightguide core 12.

Figure 6:
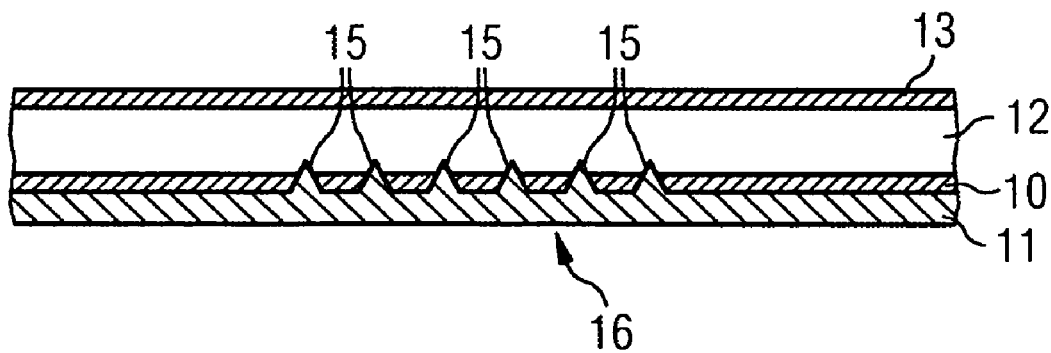
FIG. 6 shows a first embodiment of a light exiting region.

FIG. 6 shows a first embodiment of the light exiting region 16. The carrier 11 has patterning 15 in the form of elevations and/or depressions in the light exiting region 16. When the base jacket 10 is formed on the carrier 11, the base jacket 10 is interrupted in the light exiting region 16 by this patterning 15 of the carrier 11, or patterned in accordance with the patterning 15 of the carrier 11 in the form of elevations and/or depressions. When the lightguide core 12 is produced on the base jacket 10, the lightguide core 12 can therefore also be patterned in the light exiting region 16. As a result of the patterning 15, the total reflection in the light exiting region 16 at the boundary between the lightguide core 12 and the base jacket 10 is therefore cancelled out by the patterning 15 for a portion of the light in the lightguide core 12, with the result that light can exit from the lightguide core 12. The carrier 11 is preferably designed in such a way that it absorbs light, with the result that the portion of the light which emerges from the lightguide core 12 is absorbed in the carrier 11.

When the bending sensor is bent in the light exiting region 16 in what is referred to as a positive direction in which the light exiting region 16 is stretched, more light is extracted from the lightguide core 12 through scattering and/or absorption than in an unbent state of the bending sensor. Less light output can therefore be measured at the end of the lightguide core 12 and the attenuation of the light in the lightguide core 12 is increased. When the bending sensor in the light exiting region 16 bends in an opposed negative direction in which the light exiting region 16 is compressed, the light loss is reduced and a larger light output can be measured at the end of the lightguide core 12 than in the unbent state of the bending sensor, and the attenuation of the light in the lightguide core 12 is reduced.

Figure 7:
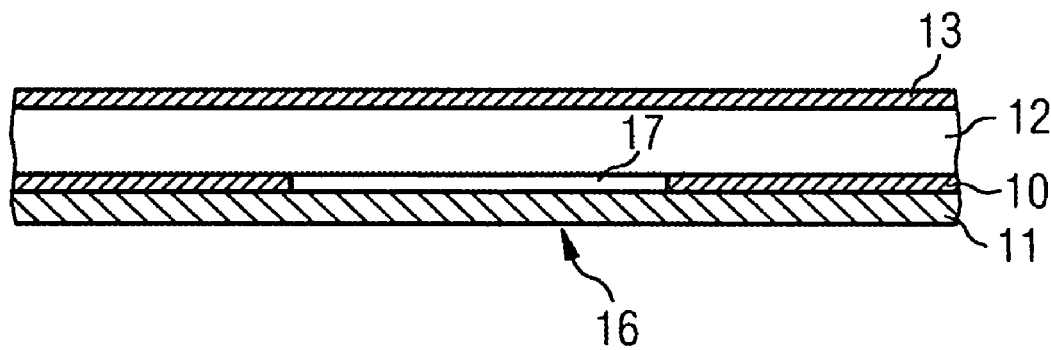
FIG. 7 shows a second embodiment of the light exiting region.

FIG. 7 shows an alternative or additional embodiment of the light exiting region 16. The base jacket 10 is interrupted in the light exiting region 16 and replaced by a jacket replacement 17. Correspondingly, it is likewise alternatively or additionally possible for the covering jacket 13 to be interrupted in the light exiting region 16 or replaced by the jacket replacement 17. The refractive index of the jacket replacement 17 differs from the refractive index of the base jacket 10. The refractive index of the jacket replacement 17 is preferably higher than the refractive index of the base jacket 10. In addition, the refractive index of the jacket replacement 17 is preferably smaller than or equal to the refractive index of the at least one lightguide core 12. The refractive index of the jacket replacement 17 can, however, also be smaller than the refractive index of the base jacket 10 or larger than the refractive index of the at least one lightguide core 12.

Figure 8:
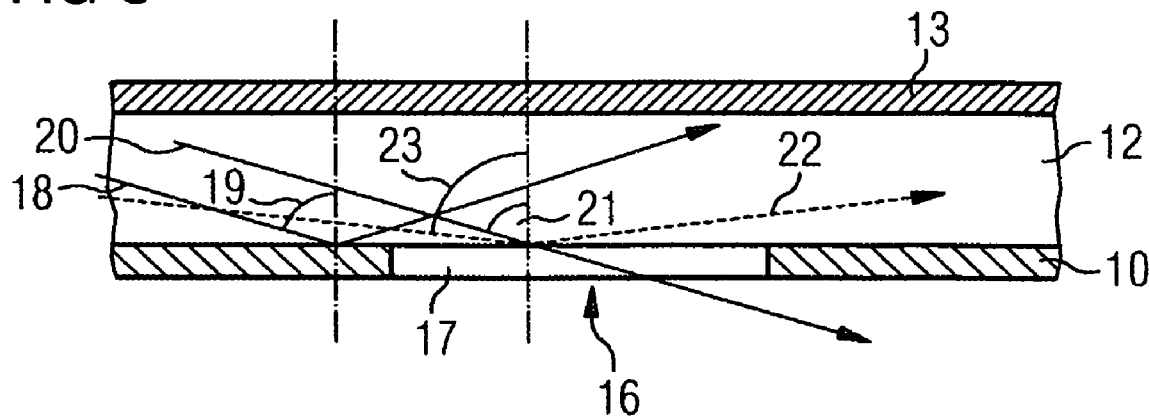
FIG. 8 shows a functional principle of the second embodiment of the light exiting region.

FIG. 8 shows a functional principle of the second embodiment of the light exiting region 16 according to FIG. 7. A first light beam 18 impinges at a first angle 19 of incidence at the boundary between the lightguide core 12 and the base jacket 10. The first angle 19 of incidence is larger than a limiting angle for the total reflection at the boundary between the lightguide core 12 and the base jacket 10, that is to say the first light beam 18 experiences total reflection at the boundary between the lightguide core 12 and the base jacket 10 and therefore remains in the lightguide core 12. A second light beam 20 with a second angle 21 of incidence which corresponds to the angle 19 of incidence impinges at a boundary between the lightguide core 12 and the jacket replacement 17. The refractive index of the jacket replacement 17 is higher than the refractive index of the base jacket 10. As a result, the second angle 21 of incidence is lower than a limiting angle for total reflection at the boundary between the lightguide core 12 and the jacket replacement 17, that is to say the second light beam 20 does not experience total reflection at the boundary between the lightguide core 12 and the jacket replacement 17, and therefore exits at least partially from the lightguide core 12. A third light beam 22 also impinges with a third angle 23 of incidence at the boundary between the lightguide core 12 and the jacket replacement 17. However, the third angle 23 of incidence is larger than the second angle 21 of incidence and larger than the limiting angle for total reflection at the boundary between the lightguide core 12 and the jacket replacement 17. As a result, the third light beam 22 experiences total reflection at the boundary between the lightguide core 12 and the jacket replacement 17, that is to say the third light beam 22 remains in the lightguide core 12. By suitably selecting the refractive index of the jacket replacement 17 it is therefore possible to predefine very precisely how much light in the light exiting region 16 can exit from the lightguide core 12 given a predefined degree of bending of the bending sensor in the light exiting region 16.

The refractive index of the lightguide core 12 is, for example, 1.49, the refractive index of the base jacket 10 and of the covering jacket 13 1.35, and the refractive index of the jacket replacement 17 1.42. The limiting angle for total refraction at the boundary between the lightguide core 12 and the base jacket 10 is then obtained as the arc sine of the quotient formed between 1.35 and 1.49, and is approximately 65°. The limiting angle for total reflection at the boundary between the lightguide core 12 and the jacket replacement 17 is correspondingly obtained as the arc sine of the quotient formed between 1.42 and 1.49, and is approximately 72°.

The refractive index of the jacket replacement 17 can, for example, also be selected to be approximately the same as or larger than the refractive index of the lightguide core 12. However, in order to avoid an excessively large loss of light, the light exiting region 16 then has to be selected to be correspondingly small in its extent.

Figure 9:
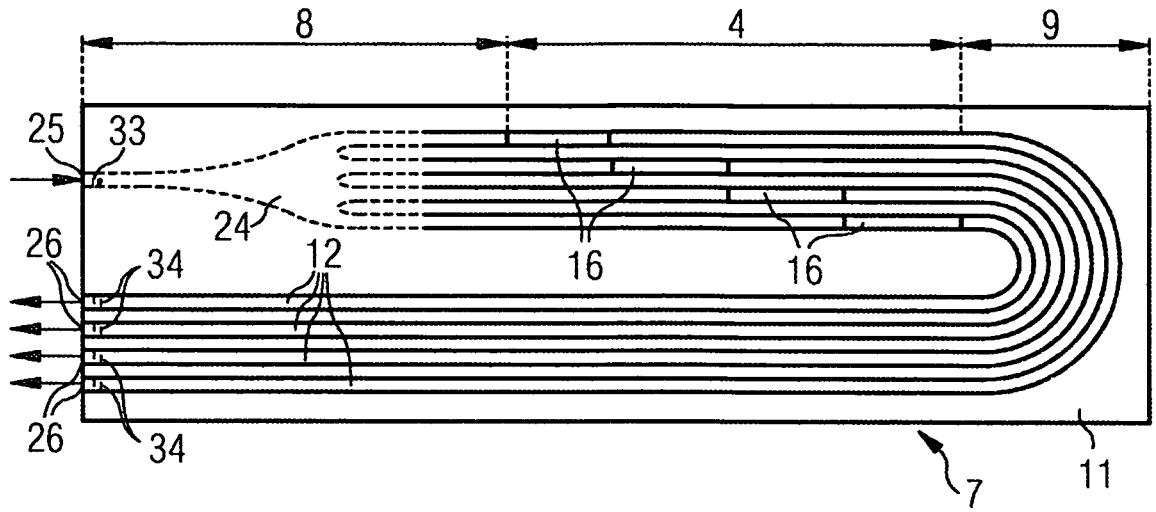
FIG. 9 shows the sensor strip with a first embodiment of a deflection region.

FIG. 9 shows a sensor strip 7 with a first embodiment of the deflection region 9. The bending sensor comprises four lightguide cores 12 and an optical coupler 24. The optical coupler 24 divides the light injected into a light injection region 25 among the four lightguide cores 12. The optical coupler 24 is embodied, together with the four lightguide cores 12, as a further planar lightguide core.

Starting from the light injection region 25 at one end of the carrier 11, the lightguide cores 12 are formed in the longitudinal direction of the carrier 11 and parallel to one another. In the deflection region 9, the lightguide cores 12 are arcuate and are then routed parallel to one another and along the carrier 11 back to the end of the carrier 11 to form a respective light extraction region 26 of the four lightguide cores 12. In this context it is necessary to ensure that a deflection radius of the respective lightguide core 12 does not undershoot a predefined minimum deflection radius. If the minimum deflection radius is undershot, the limiting angle for total reflection at the boundary between the respective lightguide core 12 and the respective base jacket 10 or the respective covering jacket 13 for the light which can be guided in the respective lightguide core 12 is undershot, with the result that the light is no longer guided in the respective lightguide core 12 and at least partially exits from it.

Figure 10:
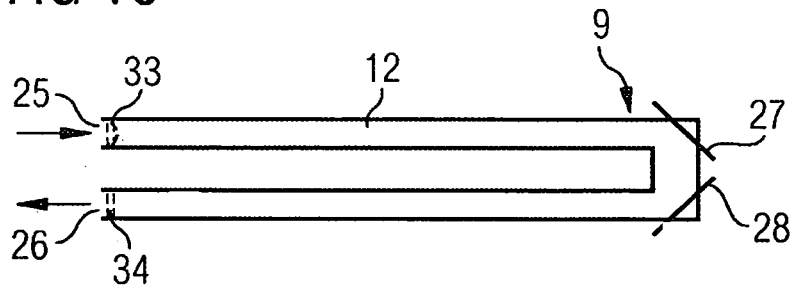
FIG. 10 shows the sensor strip with a second embodiment of the deflection region.

FIG. 10 shows a second embodiment of the deflection region 9 with reference to an individual lightguide core 12. The lightguide core 12 is formed at a right angle in the deflection region 9 in a plane parallel to the base jacket 10 on the base jacket 10. At every right angle of the lightguide core 12 a mirror, in particular a micromirror, is embedded in the lightguide core 12. For the return of the light, a first mirror 27 and a second mirror 28, which each deflect the light at an angle of approximately 90°, are provided in the deflection region 9. As a result, for the deflection of the light in the deflection region 9 it is not necessary to take into account the minimum deflection radius, with the result that the at least one lightguide core 12 can be made compact in the deflection region 9 and formed with a low spatial requirement. However, by providing at least one mirror in the at least one lightguide core 12, and given suitable orientation of the at least one mirror with respect to the profile of the at least one lightguide core 12, the light can also be deflected at other angles.

Figure 11:
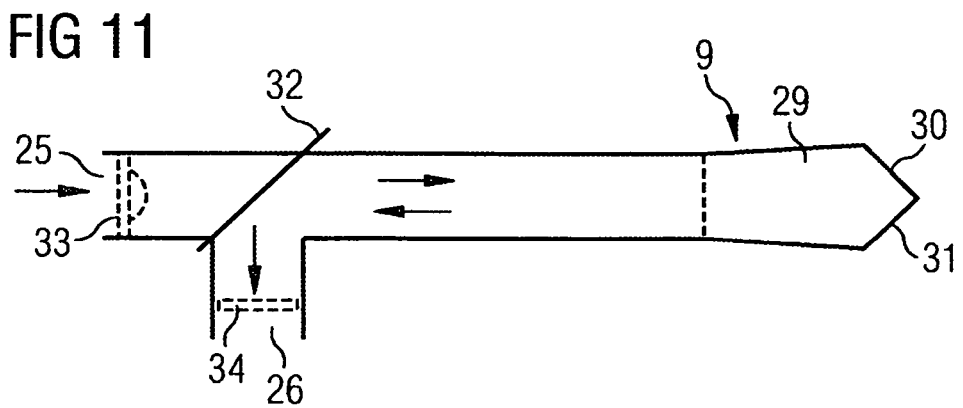
FIG. 11 shows the sensor strip with a third embodiment of the deflection region.

FIG. 11 shows a third embodiment of the deflection region 9 with reference to an individual lightguide core 12. The lightguide core 12 has, in the deflection region 9, a prism 29 which has a first mirrored region 30 at a first end face, and a second mirrored region 31 at a second end face. The first mirrored region 30 and the second mirrored region 31 essentially correspond in terms of their function to the first mirror 27 and the second mirror 28. However, the light is deflected in such a way that in the lightguide core 12 it is returned in the direction of the light injection region 25. A semi-transparent mirror 32 is arranged in the lightguide core 12 in order to separate the proportion of light which is guided from the light injection region 25 to the deflection region 9, and the portion of light which is guided from the deflection region 9 back in the direction of the light injection region 25. The semi-transparent mirror 32 is preferably arranged in the feed-in region 8 near to the light injection region 25.

The light which is returned from the deflection region 9 in the lightguide core 12 is partially deflected by the semi-transparent mirror 32 to the light extraction region 26 which is arranged, for example, at an angle of approximately 90° to the light injection region 25 on the lightguide core 12. The third embodiment of the deflection region 9 also has the advantage that by providing the prism with its mirrored end faces for deflecting the light in the deflection region 9 the minimum deflection radius does not have to be taken into account and the respective lightguide core 12 can therefore be made compact and with a low spatial requirement in the deflection region 9. As an alternative to providing the semi-transparent mirror 32, the light injection region 25 and the light extraction region 26 of the respective lightguide core 12 can each be embodied as a common light injection region 25 and light extraction region 26, and the respective light source 33 and the respective light sensor 34 can be arranged at the respective common light injection region 25 and light extraction region 26. The respective light source 33 and the respective light sensor 34 are preferably then embodiment as a common component.

The light source 33 is preferably embodied in the lightguide core 12, at the light injection region 25. The light source 33 is, for example, a light emitting diode. It is also possible to provide, in each case, a light source 33 in the light injection region 25 of each lightguide core 12. Correspondingly, in each case a light sensor 34 is preferably embedded in the lightguide core 12 at the respective light extraction regions 26. The light sources 33 and/or the light sensors 34 can, however, also be embedded in the base jacket 10 or the covering jacket 13 provided that the light from the respective light source 33 is injected in a suitable way into the lightguide core 12 or extracted in a suitable way from the lightguide core 12 towards the respective light sensor 34. In each case a further mirror for deflecting light into the respective lightguide core 12 or out of it can also be provided in the respective light injection region 25 and/or light extraction region 26.

In the carrier 11 and/or in the base jacket 10 and/or in the covering jacket 13, at least one mechanical reinforcing element can additionally be provided. The at least one mechanical reinforcing element is arranged, for example, as a mechanical reinforcing fiber parallel to the at least one lightguide core 12. The at least one reinforcing element is embedded in the carrier 11, the base jacket 10 or the covering jacket 13 during the manufacture of said components, for example.

The mechanical reinforcing elements are preferably arranged in such a way that the at least one lightguide core 12 is arranged between mechanical reinforcing elements. The diameter of the mechanical reinforcing elements is preferably greater than a diameter of the at least one lightguide core 12. As a result, the at least one lightguide core 12 is particularly satisfactorily protected against forces transverse with respect to its longitudinal direction. In particular it is therefore possible to prevent compressive forces from acting transversely with respect to the longitudinal direction of the at least one lightguide core 12 on the at least one lightguide core 12. This is advantageous since such compressive forces may cause the attenuation of the light in the at least one lightguide core 12 to change, but the impact sensor device 2 is intended only to sense bending of the sensor strip 7 in the sensing region 4. In addition, the at least one lightguide core 12 and the at least one mechanical reinforcing element are preferably arranged in a planar fashion, one next to the other.

The at least one mechanical reinforcing element is preferably manufactured from glass fiber reinforced plastic. The at least one mechanical reinforcing element can, however, also be manufactured, for example, from polyalkyleneterephthalates, for example Mylar films. In addition, for example Kevlar or glass yarns can also be used to transmit tensile forces, and plastic rods can also be used to protect against transverse compressive forces.

FIG. 12 shows a flowchart of a method for manufacturing the sensor strip 7. The method starts in a step S1. In a step S2, if appropriate the carrier 11 is prepared and/or the patterning 15 on the carrier 11 is formed. In a step S3, the base jacket 10 is either embodied as a carrier 11, or the base jacket 10 is formed on the separate carrier 11 which is provided, if appropriate. In the light exiting region 16 which is provided, the base jacket 10 is interrupted or patterned correspondingly by means of the patterning 15 of the carrier 11, or the base jacket 10 is interrupted, that is to say not formed, in the light exiting region 16 which is provided.

Alternatively or additionally, in a step S4 the jacket replacement 17 for filling in the interrupted base jacket 10 can be formed. In a step S5, the at least one lightguide core 12 is formed on the base jacket 10. In addition, the optical coupler 24 can also be formed together with the at least one lightguide core 12. In addition, if appropriate, the at least one light source 33, the at least one light sensor 34, the first and the second mirror 27, 28 or further mirrors, the semi-transparent mirror 32 or the prism 29 can, if appropriate, also be arranged on the sensor strip 7 and preferably embedded in the respective lightguide core 12.

In a step S6, at least one lightguide core 12 is covered by means of the covering jacket 13. As an alternative or addition to the step S6, the covering jacket 13 is formed in such a way that it has interruptions which are preferably replaced by the jacket replacement 17. The method ends in a step S8. If appropriate, further steps can also be provided, for example for embedding the at least one reinforcing element or for producing a protective sleeve around the bending sensor.

Different manufacturing methods are suitable for producing the at least one lightguide core 12 on the base jacket 10. For example, the at least one lightguide core 12 is applied as a liquid polymer by means of a metering method by means of a dispensing device, referred to as a dispenser, with the desired profile to the base jacket 10 and subsequently cured, for example by irradiation with ultraviolet light. In this way, very find lightguide cores 12 of less than 100 micrometers in width and more than a meter in length can be manufactured easily and cost-effectively. Alternatively, the liquid polymer can also be printed or sprayed onto the base jacket 10 with the desired profile by means of a jet printing method, which can also be referred to as a spraying method, and subsequently cured. In both methods, during the production of the at least one lightguide core 12 the sensor strip 7 is preferably moved on a carriage in the longitudinal direction under an essentially stationary dispenser or printing head. As a result, the at least one lightguide core 12 can be manufactured very precisely and homogenously over a length of more than a meter. A further manufacturing method for producing the at least one lightguide core 12 is a direct writing method. The liquid polymer is applied over a surface onto the base jacket 10 and subsequently cured along the desired profile of the at least one lightguide core 12 by exposure to light. The exposure to light can be carried out by means of a correspondingly designed mask or directly by means of a laser. Regions of the applied liquid polymer which are not exposed to light are subsequently removed, for example by means of a solvent.

The advantage is that by means of the aforesaid manufacturing methods it is possible to form a plurality of lightguide cores 12 very closely one next to the other. For example, 16 or else 32 lightguide cores 12 can be reliably formed on a sensor strip 7 which is 6 millimeters in width. The light exiting region 16 in the sensing region 4 can be positioned and dimensioned very precisely, with the result that the properties of the bending sensor can be predefined reliably and precisely. By forming the lightguide cores 12 on a polyimide basis, it is in addition possible to predefine a temperature-resistance value of up to 380° C.; lightguide cores 12 on an epoxy resin basis, are temperature resistant up to 200° C. This is advantageous in particular for use in motor vehicles. A further advantage is that the sensor strip 7 can be manufactured very easily in accordance with the desired shape. For example, bumpers of some motor vehicle models have a V-shaped profile. The sensor strip 7 and the lightguide cores 12 which are formed on them can be formed very easily in this V shape with the result that the sensor strip 7 does not have to be subsequently given the desired shape. In addition, the at least one lightguide core 12 can be manufactured quickly, precisely and cost-effectively.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for manufacturing a bending sensor, the method comprising:
   forming at least one planar lightguide core on a flexurally elastic base jacket, the planar lightguide core having a higher refractive index than the flexurally elastic base jacket;
   forming a covering jacket on the at least one planar lightguide core, the at least one planar lightguide core having a higher refractive index than the covering jacket; and
   forming a sensing region by at least one of interrupting the flexurally elastic base jacket in at least one portion of the sensing region and patterning the flexurally elastic base jacket by at least one of elevations and depressions in a plane where the flexurally elastic base jacket meets the at least one planar lightguide core.

2. The method according to claim 1, further comprising:
   forming the flexurally elastic base jacket on an elastic carrier,
   wherein the elastic carrier is patterned in the at least one portion of the sensing region by at least one of elevations and depressions, and
   wherein the at least one of the elevations and depressions in the flexurally elastic base jacket or the interruption in the base jacket are formed by at least one of the elevations and the depressions in the carrier.

3. The method according to claim 2, wherein at least one of the flexurally elastic base jacket and the covering jacket absorbs incident light.

4. A method for manufacturing a bending sensor, the method comprising:
   forming at least one planar lightguide core having a light injection region and an light extraction region on a flexurally elastic base jacket, the at least one planar lightguide core having a higher refractive index than the base jacket;
   forming at least one sensing region in a light path between the light injection region and the light extraction region of the at least one planar lightguide core by producing a covering jacket that covers the at least one planar lightguide core and which is interrupted in at least one portion of the sensing region; and forming in the at least one portion of the covering jacket of the sensing region a jacket replacement, the jacket replacement being one of having a refractive index different than the refractive index of the base jacket and absorbing incident light.

5. The method according to claim 4, further comprising:
   forming at least one groove in the flexurally elastic base jacket; and
   forming the at least one planar lightguide core in the at least one groove in the flexurally elastic base jacket.

6. The method according to claim 4, further comprising, arranging at least one mirror on the at least one planar lightguide core, the mirror adapted to deflect light in the at least one planar lightguide core parallel to a plane of the flexurally elastic base jacket.

7. The method according to claim 6, wherein a prism having a mirrored end is arranged at a first end of the at least one at least one planar lightguide core.

8. The method according to claim 6, wherein a semi-transparent mirror is arranged in the at least one planar lightguide core, the semi-transparent mirror adapted to separate a forward traveling light and a returning light in the at least one planar lightguide core.

9. The method according to claim 6, wherein the light injection region and the light extraction region of the at least one planar lightguide core are formed as a common light injection region and light extraction region of the at least one planar lightguide core.

10. The method according to claim 4, further comprising:
    forming at least two planar lightguide cores on the flexurally elastic base jacket; and
    forming an optical coupler at the light injection region, the optical coupler adapted to divide the light to be injected at the light injection region between the at least two lightguide cores.

11. The method according to claim 4, the method further comprising:
    providing at least one light source at the light injection region of the at least one planar lightguide core.

12. The method according to claim 4, in which the at least one lightguide core is applied to the flexurally elastic base jacket as a liquid polymer, in accordance with a desired profile.

13. The method according to claim 4, wherein the at least one lightguide core is applied to the flexurally elastic base jacket as liquid polymer by a jet printing method in accordance with a desired profile.

14. The method as claimed in one of claims 1, wherein the at least one lightguide core is applied to the flexurally elastic base jacket as liquid polymer and is cured by means of a direct writing method in accordance with a desired profile of the lightguide core.

15. The method according to claim 4, the method further comprising:
    providing at least one light sensor at the light extraction region of at least one of the at least one planar lightguide core, the flexurally elastic base jacket, and a covering jacket formed on the at least one planar lightguide core.

16. The method as claimed in one of claims 4, wherein the at least one lightguide core is applied to the flexurally elastic base jacket as liquid polymer and is cured by means of a direct writing method in accordance with a desired profile of the lightguide core.

17. The method according to claim 1, further comprising, arranging at least one mirror on the at least one planar lightguide core, the mirror adapted to deflect light in the at least one planar lightguide core parallel to a plane of the flexurally elastic base jacket.

18. The method according to claim 17, wherein a prism having a mirrored end is arranged at a first end of the at least one at least one planar lightguide core.

19. The method according to claim 1, further comprising:
    forming at least one groove in the flexurally elastic base jacket; and
    forming the at least one planar lightguide core in the at least one groove in the flexurally elastic base jacket.

20. The method according to claim 1, further comprising:
    forming at least two planar lightguide cores on the flexurally elastic base jacket; and
    forming an optical coupler at the light injection region, the optical coupler adapted to divide the light to be injected at the light injection region between the at least two lightguide cores.

21. The method according to claim 1, the method further comprising:
    providing at least one light source at the light injection region of the at least one planar lightguide core.

22. A bending sensor comprising:
    a flexurally elastic base jacket;
    at least one planar lightguide core formed on the flexurally elastic base jacket;
    a covering jacket covering the at least one lightguide core; and
    a sensing region formed by at least one of interrupting the flexurally elastic base in at least one portion of the sensing region and patterning the flexurally elastic base jacket by at least one of elevations and depressions in a plane where the flexurally elastic base meets the planar lightguide core,
    wherein a refractive index of the elastic base and the covering jacket is less than a refractive index of the at least one planar lightguide core.

23. The bending sensor according to claim 22, wherein the flexurally elastic base jacket further comprises a jacket replacement portion in at least one portion of the sensing region, the jacket replacement portion having a higher index of refraction than the base jacket.

* * * * *